United States Patent Office.

WILLIAM S. CORNELL, OF NEW YORK, N. Y.

Letters Patent No. 76,167, dated March 31, 1868.

---

IMPROVEMENT IN MANUFACTURE OF CHEESE.

---

*The Schedule referred to in these Letters Patent and making part of the same.*

---

TO ALL WHOM IT MAY CONCERN:

Be it known that I, WILLIAM S. CORNELL, of the city, county, and State of New York, have invented a new and useful Improvement in the Manufacture of Cheese, of which the following is a full, clear, and exact description.

The nature of my invention in the manufacture of cheese consists, firstly, in concentrating the milk by evaporation preparatory to introduction of the rennet or other substance used to convert the milk-sugar into lactic acid, and cause separation into curd and whey; likewise in the formation of the curd *in vacuo*, to effect a more perfect or ready union of the caseine and butter. It also consists in evaporating the whey, whereby loss of butter is avoided, and, when done *in vacuo*, the curd prevented from being over-scalded.

In the manufacture of cheese according to this my invention, the milk may first be subjected to a preparatory evaporating process at a low temperature, which need only be sufficiently high to expel the watery matter contained in it before introducing the rennet, or other substance for effecting like results as the rennet. By thus subjecting the milk to a preparatory evaporation, as described, less bulk of whey is formed, and consequently that loss of butter and caseine obviated which are ordinarily contained or left in the whey, and a larger quantity or percentage of cheese obtained from a given quantity of milk; also richer cheese produced, by reason of the large proportion of butter which is retained in the cheese. This preparatory process should be conducted at a low temperature, *in vacuo*, as a sufficient temperature for evaporation in the atmosphere would produce coagulation of the caseine. To effect the desired or full evaporation, the milk should be placed in a vacuum-pan, and evaporated at about from 90° to 170° Fahrenheit, till it assumes the desired density, evaporating, say, seventy-five (75) per cent. or thereabouts of the water.

The following after-treatment or treatments may next be resorted to, by introducing, *in vacuo*, to the concentrated milk, the rennet or other substance used to cause separation of the curd and whey. This should be done under a temperature of about blood-heat, and the whole be allowed to stand till the curd has settled, the caseine and butter uniting more readily *in vacuo*. Continuing the process of manufacture, I next cut up the curd, say, by a suitable cutter, worked through a stuffing-box of the vacuum-pan, after which I evaporate the whey *in vacuo*, commencing at about a temperature of 140° Fahrenheit, and increasing the heat as much as may be desired to scald the curd, accordingly as the cheese is required to be more or less hard. The curd may then be removed from the vacuum-pan, and salted and pressed in the usual or any proper manner, to complete the manufacture of the cheese.

If desired, the preparatory process of concentrating the milk by evaporation prior to adding the rennet, may alone be used, and the after-treatment of such concentrated milk be the same as now ordinarily practised in making cheese from milk which has not been so concentrated. Likewise this my invention includes the formation of the curd *in vacuo*, as described, without reference to the previous (if any) treatment of the milk or subsequent working of the curd or butter and whey; and furthermore, includes the evaporation of the whey, as described, separate and distinct from any particular previous treatment of it or of the milk and curd.

What I claim as new and useful, and desire to secure by Letters Patent, is—

1. In the manufacture of cheese, concentrating the milk by evaporation preparatory to introduction of the rennet, or substitute therefor, substantially as specified.

2. The formation *in vacuo* of the curd from which the cheese is made, essentially as herein set forth.

3. In the manufacture of cheese, retaining the butter usually lost in the whey, by evaporating the latter from the curd, substantially as specified.

WM. S. CORNELL.

Witnesses:
 E. H. PETERS,
 D. W. ANDRUS.